United States Patent
Kanke et al.

(10) Patent No.: US 7,565,255 B2
(45) Date of Patent: Jul. 21, 2009

(54) THERMAL FLOW METER AND CONTROL SYSTEM

(75) Inventors: Atsushi Kanke, Hitachi (JP); Izumi Watanabe, Hitachinaka (JP); Keiji Hanzawa, Mito (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/953,608

(22) Filed: Sep. 30, 2004

(65) Prior Publication Data

US 2005/0072225 A1    Apr. 7, 2005

(30) Foreign Application Priority Data

Oct. 1, 2003    (JP)    ............... 2003-343062

(51) Int. Cl.
*G01F 1/12*    (2006.01)
(52) U.S. Cl. .................... 702/100; 702/45; 73/1.16; 73/204.11
(58) Field of Classification Search .............. 702/45, 702/47, 49, 50, 53, 75–79, 86, 89, 100; 73/1.16, 73/1.34, 170.12, 204.11, 204.16, 204.18, 73/204.19, 204.25
See application file for complete search history.

(56) References Cited

U.S. PATENT DOCUMENTS

| 4,237,833 | A | * | 12/1980 | Des Lauriers | ............... 123/320 |
| 5,357,967 | A | | 10/1994 | Dixon et al. | ................. 600/504 |
| 5,749,222 | A | * | 5/1998 | Nakajima et al. | ............. 60/274 |
| 5,750,889 | A | * | 5/1998 | Kowatari et al. | ........... 73/118.2 |
| 5,817,932 | A | * | 10/1998 | Nishimura et al. | ......... 73/118.2 |
| 5,832,403 | A | | 11/1998 | Kowatari et al. | |
| 6,397,673 | B1 | * | 6/2002 | Kanke et al. | ............. 73/204.11 |
| 6,520,009 | B2 | | 2/2003 | Kobayashi et al. | ........ 73/204.18 |

FOREIGN PATENT DOCUMENTS

| EP | 0 961 105 A1 | 12/1999 |
| GB | 2327503 | 1/1999 |
| JP | 62-000821 | 1/1987 |
| JP | 6-10752 | 1/1994 |
| JP | 08-062012 | 3/1996 |
| JP | 11-014418 | 1/1999 |
| JP | 2003-13789 | 1/2003 |

* cited by examiner

*Primary Examiner*—Manuel L Barbee
(74) *Attorney, Agent, or Firm*—Mattingly & Malur, P.C.

(57) ABSTRACT

In regard to an output of an intake flow meter for an internal combustion engine, a pulsation error can be reduced and dispersion in correction at the time of correction of response delay (a recovering of response delay) is reduced. A digital device is used for pre-processing of a control unit for inputting a flow rate measuring signal. An output voltage of the flow sensor is converted into a digital value, the digital value is converted into a flow rate and adds a response delay. The control unit detects a degree of response delay in reference to dispersion in a clock signal so as to perform response delay recovering and reduce dispersion of the response delay.

5 Claims, 13 Drawing Sheets

FIG. 4 A
SENSOR OUTPUT SIGNAL

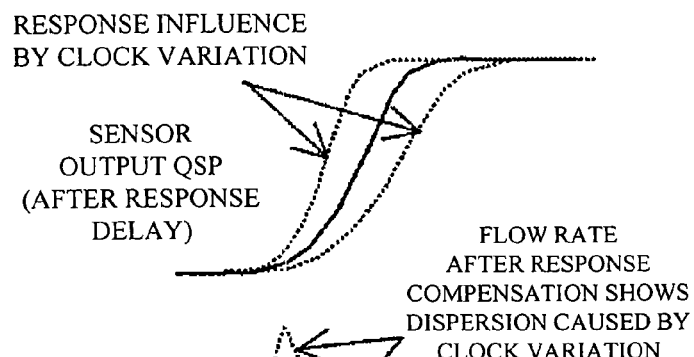

RESPONSE INFLUENCE BY CLOCK VARIATION

SENSOR OUTPUT QSP (AFTER RESPONSE DELAY)

FLOW RATE AFTER RESPONSE COMPENSATION SHOWS DISPERSION CAUSED BY CLOCK VARIATION

FIG. 4 B
RESPONSE RECOVERY SIGNAL (PRIOR ART)

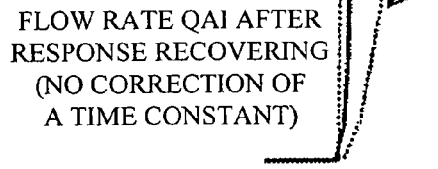

FLOW RATE QA1 AFTER RESPONSE RECOVERING (NO CORRECTION OF A TIME CONSTANT)

FIG. 4 C
RESPONSE RECOVERY SIGNAL (THIS INVENTION)

FLOW RATE QA1 AFTER RESPONSE RECOVERING (THIS INVENTION) (A CORRECTION OF TIME CONSTANT)

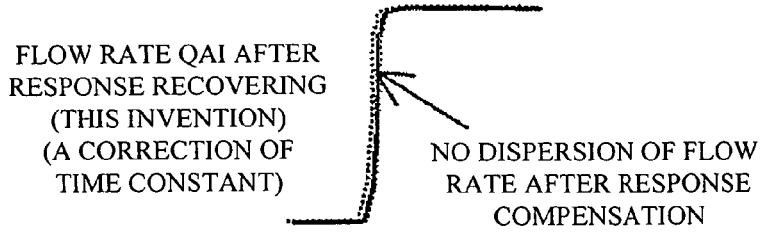

NO DISPERSION OF FLOW RATE AFTER RESPONSE COMPENSATION

CLOCK COUNTING WITH A REFERENCE SIGNAL

A REFERENCE CLOCK IS OVERLAPPED ON A FREQUENCY OUTPUT

CLOCK MODE

JUST AFTER VB ENERGIZATION

DELAY DETERMINATION MODE

NOT JUST AFTER VB ENERGIZATION

RELATIONSHIP BETWEEN FLOW
RATE AND OUTPUT FREQUENCY

RELATIONSHIP BETWEEN FLOW RATE
AND NUMBER OF COUNTED CLOCKS

THERMAL FLOW METER AND CONTROL SYSTEM

BACKGROUND OF THE INVENTION

1. Field of the Invention

This invention relates to a thermal flow meter for detecting a flow rate of fluid such as air and the like and a flow rate measuring device utilizing the thermal flow meter.

2. Background Art

The thermal air flow meter using a thermo-sensitive resistor such as a heat generating resistor and a temperature compensating resistor and the like having a temperature characteristic can directly detect a mass amount of air, so that this air flow meter is widely used for measuring a flow rate of intake air for an internal combustion engine of an automobile and the like. A detected air flow rate signal is utilized for calculating a fuel injection amount of an electronic controlled fuel injection device and the like.

The thermal sensitive type resistor such as a heat generating resistor or the like of a type in which a platinum wire is wound around a bobbin and coated with glass has been widely used and in recent years, a thin film type in which a thin film resistor is formed on either a ceramic substrate or on a silicon substrate and a semiconductor type such as a polysilicon have been proposed.

As a flow rate detecting system, there have been provided one system in which a heat generating resistor mounted at a flow path is heated and controlled in such a way that a temperature difference between it and the temperature compensating resistor may become a predetermined difference and an electrical current flowing at the heat generating resistor is directly detected; and the other system in which temperature detecting resistors are arranged at both sides of the heat generating resistor and a flow rate is detected in reference to the temperature difference of the temperature detecting resistors and the like. Both of them basically utilize a resistive temperature characteristic which is changed when the thermo-sensitive resistor heat exchanges with fluid.

When a flow rate detecting element showing a relative high response delay in output is used, it is necessary to correct a response delay by inversely changing a time constant in delay in response. Such a correction as above for delay in response is carried out at the sensor side in a step (a pre-processing) performed before inputting a flow rate detecting signal to a control device (an engine control unit, for example) (the gazette of Japanese Unexamined Patent Publication No. 62012/1996 and the gazette of Japanese Unexamined Patent Publication No. 14418/1999 and the like) and carried out at the engine control unit (the gazette of Japanese Unexamined Patent Publication No. 10752/1994 and the gazette of Japanese Unexamined Patent Publication No. 13789/2003, for example).

The former is one example of a correction of characteristic of the flow meter (a sensor) performed through a digital correction, and the latter is one example of a system used at the engine control unit for improving a measurement error caused by a response delay of the sensor. Both of them are used for improving the delay in response when a sensor showing a high delay in response is utilized.

In addition, the thermo-sensitive type flow rate sensor has a non-linear output characteristic and also shows a pulsation caused by a blow-by gas at the engine and the like. Since they are causes for producing factors for error of output signal, the gazette of Japanese Unexamined Patent Publication No. 94620/1999 and the like have a description about one example in which the output signal is digitally corrected at the sensor circuit side in a digital manner and outputted to the engine control unit.

In the gazette of Japanese Unexamined Patent Publication No. 821/1987 is described a technology in which when there occurs a pulsation flow having a high pulsation amplitude of an amount of intake air and accompanied with a partial inverse flow at a region of low number of rotation of an engine with 4 cylinders or less or at a region showing a heavy load operation, the pulsation is to be corrected because an accuracy is decreased in the prior art air flow rate device.

In addition, as a method for decreasing an error in a flow rate output signal accompanied with a pulsation, the gazette of Japanese Unexamined Patent Publication No. 316145/1999 and the gazette of Japanese Unexamined Patent Publication No. 337382/1999 and the like have a proposal that an error correction is carried out as follows by using either the engine control unit or the controlling microcomputer. That is, a non-linear sensor output signal is converted into a linear signal (a flow rate) under application of a map to convert it into an air flow rate and the like, the pulsation amplitude is reduced by a filter, then it is changed into a non-linear line again to cause the amplitude of the final output signal to be reduced and the error is reduced.

[Patent Document 1]
Gazette of Japanese Unexamined Patent Publication No. 62012/1996

[Patent Document 2]
Gazette of Japanese Unexamined Patent Publication No. 14418/1999

[Patent Document 3]
Gazette of Japanese Unexamined Patent Publication No. 10752/1994

[Patent Document 4]
Gazette of Japanese Unexamined Patent Publication No. 13789/2003

[Patent Document 5]
Gazette of Japanese Unexamined Patent Publication No. 94620/1999

[Patent Document 6]
Gazette of Japanese Unexamined Patent Publication No. 821/1987

[Patent Document 7]
Gazette of Japanese Unexamined Patent Publication No. 316145/1999

[Patent Document 8]
Gazette of Japanese Unexamined Patent Publication No. 337382/1999

In general, a relationship between an output of a thermal flow meter using a heat generating resistor and a flow rate of air is expressed by an equation as follows that is known as King's equation.

$$Ih^2 \cdot Rh = C1 + C2\sqrt{Q}(Th - Ta) \qquad (1)$$

where, Ih denotes a heating current flowing in the heat generating resistor, Rh denotes a resistance value of the heat generating resistor, Th denotes a surface temperature of the heat generating resistor, Ta denotes an air temperature, Q denotes a flow rate of air, C1, C2 denote a constant defined by the heat generating resistor.

Generally, the output of an air flow meter is set such that the heating current Ih is detected as a voltage value using the detecting resistor. In the engine control unit used for controlling an internal combustion engine, an output current value of the sensor is converted into a flow rate value in reference to the relation of the equation (1) to control a ratio between air and fuel for the internal combustion engine, for example.

A certain linear forming means becomes necessary for detecting a flow rate because a relationship between an output signal of the thermal flow meter and an actual flow rate is a non-linear relation (the square root of the flow rate is a voltage value) as indicated in the equation (1).

In addition, when a dynamic flow variation element such as a pulsation or the like is contained in a flow of fluid, there has been already proposed to provide means as a method for reducing its detection error to be performed such that after a flow rate detecting signal is converted into a digital form, the signal is converted into an air flow rate, changed into a linear form (linear formation), the pulsation amplitude is reduced or pulsation is unified using a low-pass filter and the like in a linear region; and after these operations, the signal is returned back again to a non-linear signal of its original signal form as required and finally the signal is changed into a signal hardly influenced by the pulsation.

In this case, the signal having pulsation amplitude reduced using a low-pass filter and the like shows a response delay, so that the control unit (the engine control unit, for example) requires a processing for recovering its responding characteristic.

At that time, when the low-pass filter is constituted by a digital means, the delay in response of the signal after reduction in pulsation also produces dispersion (variation).

Accordingly, if a sufficient arrangement is not applied to the dispersion in the delay of the response, an effect attained through a recovery processing is also widely dispersed even if the recovery processing for the response characteristic is carried out at the engine control unit side. Further, although the dispersion in response characteristic after the recovering operation can be reduced if a high precision clock signal such as that found in a crystal or the like is used at the digital means, the cost of the sensor device is increased as a result.

SUMMARY OF THE INVENTION

It is an object of the present invention to realize a flow meter capable of reducing a pulsation error of the flow meter and further capable of reducing dispersion in correction during a correction in delay in response (a recovering of delay in response) under an environment of pulsation of an internal combustion engine or a substantial inverse flow.

In order to attain the aforesaid object, the present invention basically provides means as follows.

A thermal flow meter having a flow rate detecting element for outputting a non-linear signal in response to a flow rate has a response delay element for adding a response delay during a process (a pre-processing step) for processing an output signal of the flow rate detecting element, and means for transmitting information on this delay in response to the control unit having a response delay recovering function. As the information on the delay in response, there are provided some parameters indicating a degree in delay in response or dispersion.

The control unit described above has a function for correcting the delay in response described above and a function for reducing dispersion in correction of delay in response on the basis of the aforesaid parameters.

In order to reduce an error in measurement when the flow rate shows a pulsation, for example, the pre-processing digital device of the control unit comprises means for converting an output voltage of the sensor detecting a flow rate, a converting means (a linear processing means) for converting the digital value to a flow rate, means for smoothening the flow rate value (for example, this is a low-pass filter which becomes an element for adding the delay in response), and means for converting the smoothened flow rate value into a voltage value and the like. In addition, the digital pre-processing device is provided with a selecting means for changing over between the output signal after the pre-processing and a clock signal of the device using a selecting signal and outputting it.

Then, the control unit (a device at a side for receiving the output signal of the flow meter) detects a degree of the delay in response in reference to dispersion of the clock signal, recovers the delay in response and performs a correction for reducing the dispersion.

With the aforesaid means being applied, it is possible to increase a measurement precision for the pulsation or the flow rate at the time of response without losing a characteristic of original signal of the sensor during pulsation of the flow rate or during a response in its transmission.

Further, as an element to add the aforesaid delay in response, although the low-pass filter for smoothing the output signal corresponds to the element, the element for adding the delay in this response is also used under the following situation, for example. That is, the situation is set such that as the flow rate detecting element, an element having a high speed responding characteristic (for example, a semi-conductor element type) is used and as the control unit receiving it, a relative less-expensive unit of a type in which a responding characteristic is not so fast is used. In such a case as above, although it can be considered that the response delay element can be added for a pre-processing operation so as to cause both of them to be adapted for it, it is also effective for correcting dispersion in delay of response (caused by a dispersion of the clock signal, for example) generated at that time.

It is possible to reduce an error caused by a non-linear characteristic without damaging a basic characteristic of the sensor output of the thermal flow meter and further it is possible to release some limiting conditions using the flow meter of the present invention. In addition, it becomes possible to realize the flow meter having the correction dispersion reduced at the time of response delay correction (a recovering of the response delay, and drivability of an automobile can be improved and its productivity can be improved. In addition, the measurement error at the time of pulsation and transmission is reduced to enable a more superior precise control to be attained when the present invention is applied for the engine control and then it has an effect of reducing an amount of discharging gas or improving a fuel consumption.

BRIEF DESCRIPTION OF THE DRAWINGS

FIG. 4 is an illustrative view for showing a response delay according to the preferred embodiment of the present invention;

FIG. 12 is an operative illustration for setting an output when a power supply is turned on;

DETAILED DESCRIPTION OF THE PREFERRED EMBODIMENTS

Figure 1:
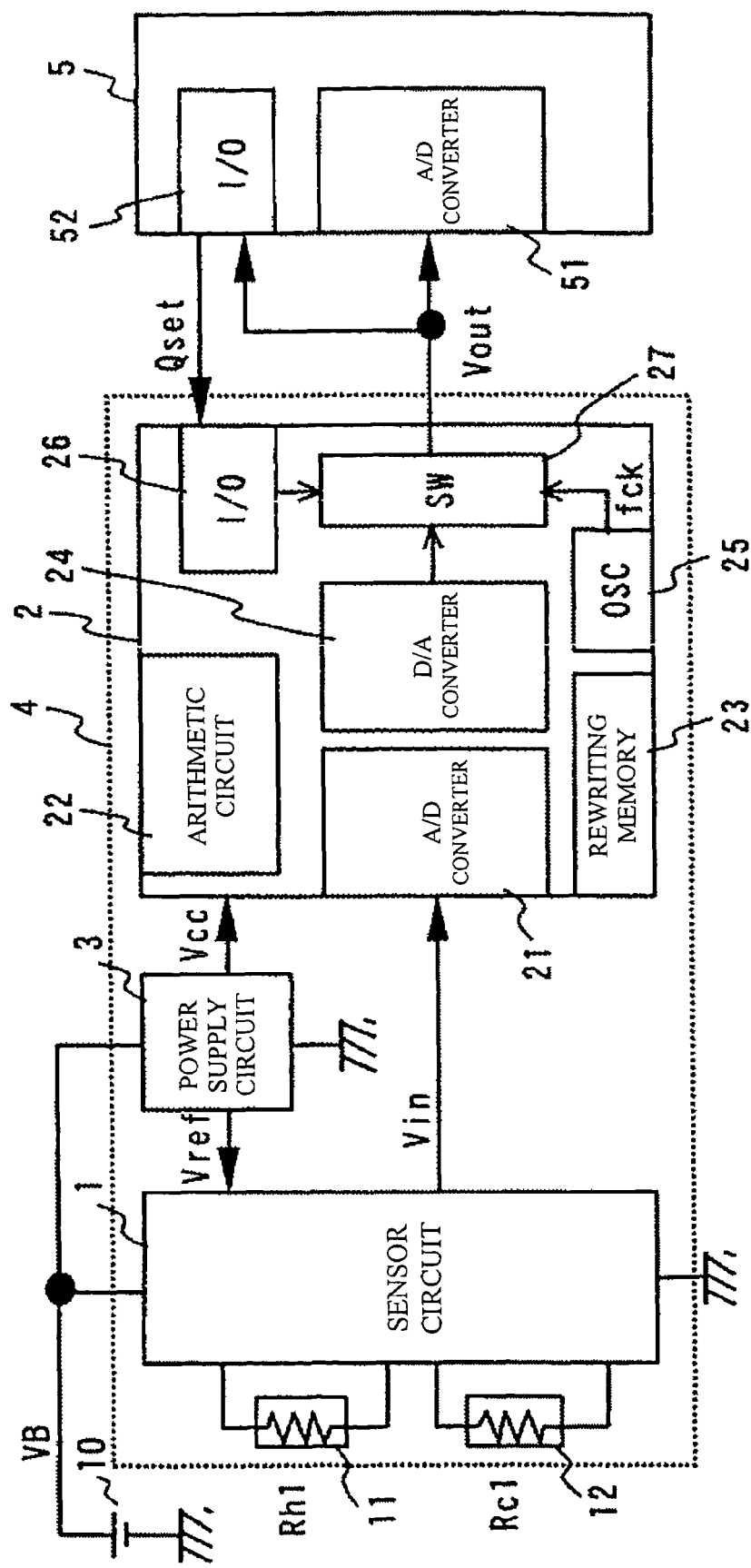
FIG. 1 is a configuration view for showing a flow meter and a system using the same according to a first preferred embodiment of the present invention.

Referring now to the drawings, some preferred embodiments of the present invention will be described as follows.

Figure 2:
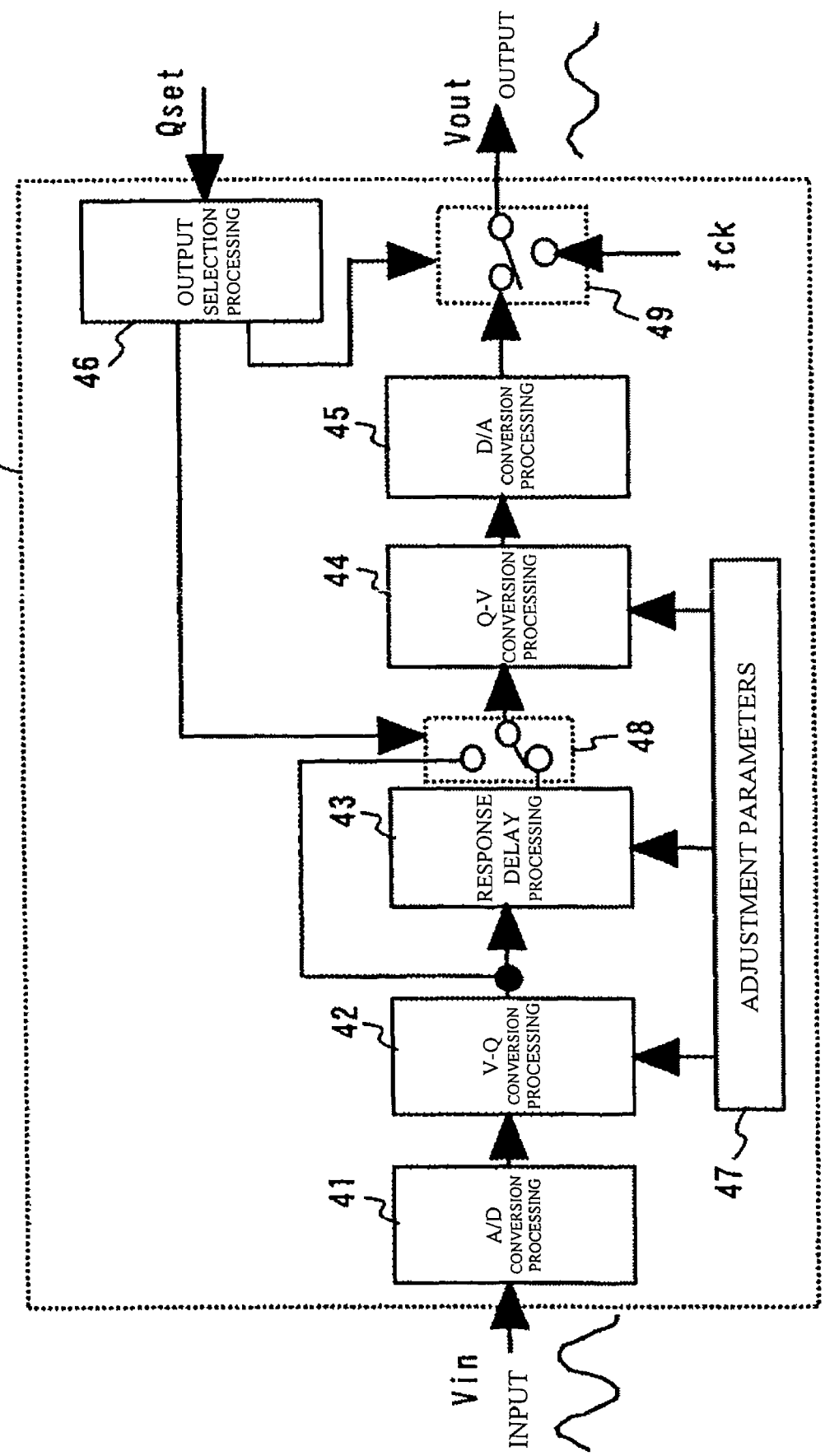
FIG. 2 is a block diagram for showing a digital processing for a flow rate output signal of the first preferred embodiment.

FIG. 1 shows a block circuit of a flow rate control device 4 according to a first preferred embodiment of the present invention. In FIG. 2 is shown a digital circuit (a pre-processing circuit) 2 for pre-processing an output of a flow meter according to a first preferred embodiment and sending it to a control unit (a signal processing unit) 5.

A driving circuit (a sensor circuit) 1 for the thermal flow meter is connected to a power supply 10 so as to control a heating for current flowing in a heat generating resistor 11 in such a way that a temperature difference between the heat generating resistor 11 and a temperature compensating resistor 12 may keep a predetermined temperature difference. The heat generating resistor 11 is arranged at a passage for a flow rate measured object so as to perform a heat exchanging operation between it and fluid in correspondence with flow rate. Then, as the flow rate is increased, a calorie of the heat generating resistor to be removed is increased, so that a heating current for use in keeping the temperature difference between it and the temperature compensating resistor is increased.

As a flow rate signal of the thermal flow meter, an output signal for converting a current flowing at the heat generating resistor 11 into a voltage is used or temperature detecting resistors are arranged at an upstream side and a downstream side of the heat generating resistor 11, and then an output difference of these temperature detecting resistors is utilized. The latter system calculates an air flow rate in reference to a difference in output signals of both temperature detecting resistors while noticing the fact that the temperature of the temperature detecting resistor positioned at the upstream side of the heat generating member is decreased as the flow rate is increased than that of the temperature detecting resistor positioned at the downstream side in reference to a flow of the fluid, and it has an advantage that a direction characteristic of the fluid can also be detected.

An output of the thermal flow rate detecting element (a thermal flow meter) is a non-linear output and contains a pulsation component and they become a cause for flow rate error of the output signal. The digital processing device 2 constitutes a digital error adjustment device for correcting such an error as above and becomes a pre-processing circuit for a subsequent stage control unit (a signal processing unit). The digital processing device 2 is constituted by digital means such as a microcomputer or an exclusive logic and the like.

The content of the error adjustment of the output signal executed by the digital means 2 is described in detail in the gazette of Japanese Unexamined Patent Publication No. 316145/1999, for example.

In the preferred embodiment of the present invention, this digital processing circuit 2 is further added with an intentional response delay means, means for transmitting the response delay information to a subsequent stage control unit 5 (I/O 26, a selection switch 27 in FIG. 1; an output selection processing unit 46 and a selection switch 49 in FIG. 2); and means for selecting whether or not the response delay processing is executed in response to an instruction of the control unit 5 (I/O 26 in FIG. 1; an output selection processing unit 46 and a selection switch 48 in FIG. 2).

The error adjustment converts an output signal Vin of the sensor circuit 1 into a digital value through an analog/digital converter (A/D converter) 21. An arithmetic circuit 22 applies an error correction (linear forming and smoothening processing) to this digital signal by using the correction data prepared in a re-writing memory 23, and outputs a voltage value (a signal applied with an error adjustment) similar to the output of the sensor circuit 1 to the engine control unit 5 through an output signal selection means (SW) 27 by the digital/analog converter (D/A converter) 24.

In this case, referring now to FIG. 2, a flow of an error adjustment arithmetic processing 40 executed by the arithmetic circuit 22 of the digital processing circuit 2 will be described as follows.

An output Vin of the sensor circuit 1 is inputted at the arithmetic processing part 40, the analog/digital conversion processing 41 is executed to cause the output Vin to become a digital value Vad.

Then, a V-Q conversion processing (a conversion of a voltage-flow rate) 42 is applied to the digital value Vad. The V-Q conversion processing 42 is carried out such that the digital value Vad indicating a non-linear characteristic in respect to the flow rate is converted into a flow rate Qa under application of a VQ map mapped in the re-writing memory 23 (FIG. 1). This processing causes the output signal to be processed in a linear form. Further, prior to the V-Q conversion, a response of the sensor output may be recovered with a voltage value. In this case, it is possible to attain a more accurate flow rate value Qa.

Then, the flow rate value Qa is applied with a smoothening processing 43 (a response delay adding processing) through a low-pass filter, for example.

Whether or not this response delay processing 43 is executed can be selected by the soft switch 48 at the time of outputting. Operation of the soft switch 48 is carried out through the output selection processing 46 in response to an instruction from the control unit 5.

If the response delay processing 43 is selected, the flow rate value Qa is processed with the digital Q-V conversion (a conversion of flow rate-voltage) after selection elapses, and if the response delay processing 43 is not selected, the flow rate value Qa is processed directly with the digital Q-V conversion (a conversion of flow rate-voltage), thereby a non-linear signal similar to the inputted voltage signal Vin is formed and an analog signal is outputted by the digital/analog converter 45. Further, these series of processing are carried out using adjustment parameters.

Digital processing 40 enables the output selection processing 46 to be carried out with a control signal Qset from the engine control unit and the like. With this operation, it is possible to change over the flow rate output signal and a reference clock signal fck through the switch 49 (the switch 27 in FIG. 1) and output them or to select either a presence or a non-presence of the response delay through the switch 48.

In this case, the response delay processing 43 can be carried out by applying a processing enabling an average value to be variable at the time of pulsation through some adjustment parameters when the voltage signal of the sensor is converted into a flow rate to apply a smoothening state.

In the present preferred embodiment, it is possible to output different signals such as a normal voltage output Vout and the reference clock fck or the like through one signal line via the switch 49 in reference to a selection signal or the like from an external part (or a repeating processing of the digital error adjustment device 2 itself when an internal specified condition is fulfilled) from the sensor (a flow meter).

The output signal selecting means (SW) 27 switches between the reference clock signal fck of an oscillator (OSC) 25 and an output Vout of the analog/digital converter (D/A converter) 24 in reference to an external selection signal Qset set through the I/O (interface) device 26.

Figure 3:
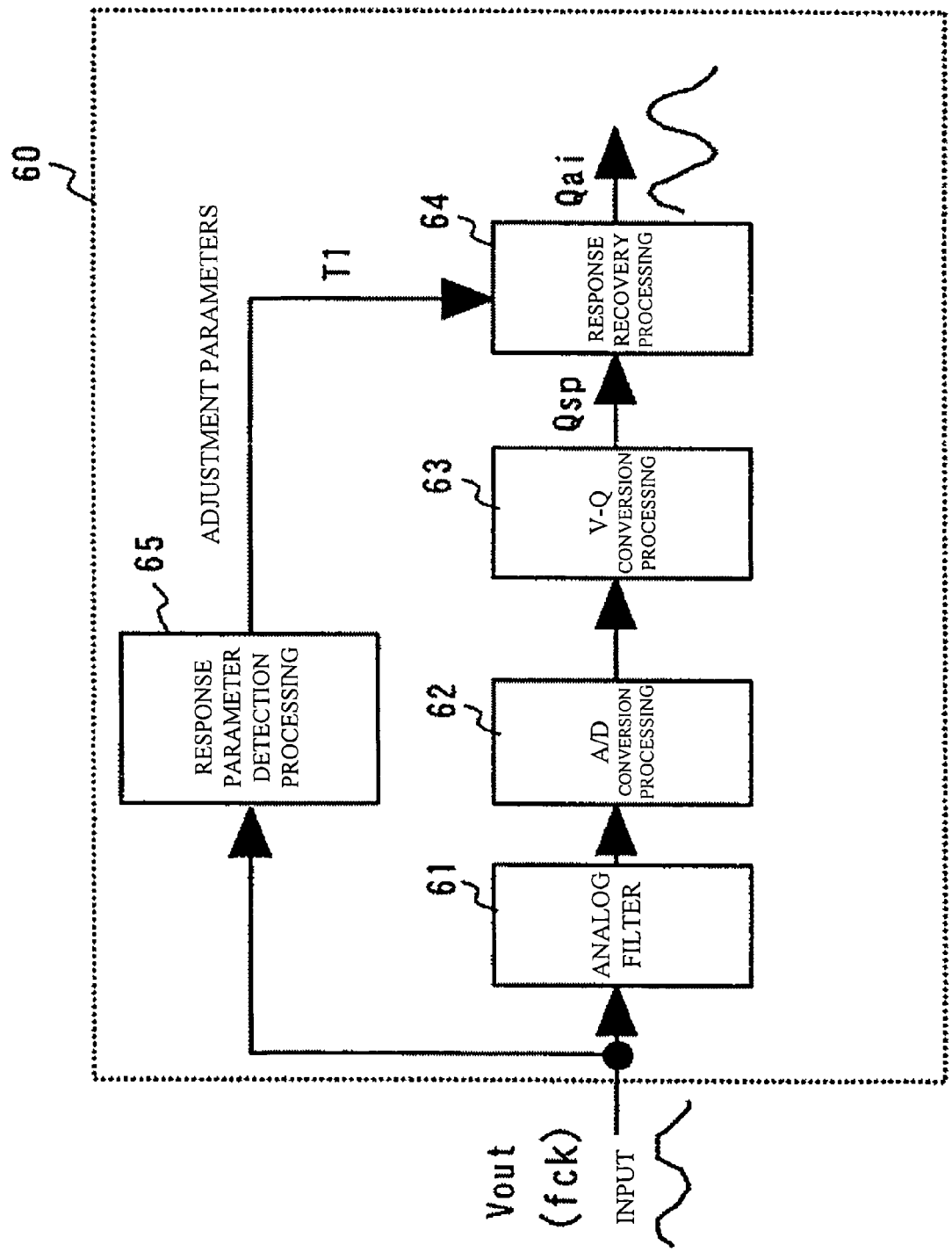
FIG. 3 is a block diagram for showing a digital processing of an engine control unit for inputting a flow rate output signal.

Next, referring to FIG. 3, a flow of arithmetic processing of the engine control unit 5 will be described as follows. The output signal Vout of the sensor is received, changed into a digital value by the analog/digital conversion processing 62 through the analog filter 61 and further converted into a flow rate value through a V-Q conversion (voltage to flow-rate conversion) 63. After this processing, the flow rate Qsp (a value in which the output signal Vout of the sensor having a response delay is converted into a flow rate) is applied with a response recovery processing 64 to attain a signal Qai having its responding characteristic recovered. In this case, a responding characteristic of the response recovery processing 64 is adjusted with an adjustment parameter T1 for use in recovering the response. Although it will be described here only with T1 applied as one time constant of a representing example, there occurs no problem even if a plurality of parameters are present.

There occurs sometimes that the reference clock signal fck is inputted to the control unit 5 in place of the flow rate output signal Vout through a sensor selection switch 27 at the time of starting operation or using the control signal Qset got from the engine control unit and the like. In that case, it is possible to acknowledge a dispersion of the reference clock fck by detecting either a frequency of the reference clock or the counted number of pulses within a specified time. If the dispersion of the reference clock is acknowledged, it becomes also possible to attain an automatic production of some parameters for adjustment applied at the response recovery processing 64.

Effects of the present invention will be described in reference to a step response shown in FIG. 4 as follows.

At first, as shown in FIG. 4(*a*), the output signal of the sensor processed at the engine control unit shows a gradual rising through a response delay processing performed at the sensor side. In this case, if it is assumed that the reference clock at the sensor side shows a variation due to its dispersion, the signal shows a changing responding characteristic and becomes a signal indicated by a dotted line having a dispersed response. A responding characteristic is recovered by applying the response recovery processing 64 to this signal.

As shown in FIG. 4(*b*), if the correction is performed in compliance with the original characteristic of the central value, the flow rate after response accommodation is widely dispersed due to variation in clock or dispersion. This dispersed situation becomes remarkable as a dispersion of the clock is high.

To the contrary, as shown in FIG. 4(*c*), it becomes possible to restrict substantially the dispersion after accommodation of response by changing the adjustment parameters in response to a dispersion of the clock in the present invention.

In particular, the response delay recovery processing 64 in the present invention provides an effective operation even when it is used under a combination of a flow sensor having a high-speed responding characteristic, a semiconductor sensor constituted on a silicon diaphragm, for example. That is, although the flow sensor having a high-speed response characteristic itself has no response delay and has a less amount of dispersion, if the sensor is passed through the response delay element such as a smoothening processing and the like, it may produce a response delay and further a dispersion is generated in the response delay under an influence of the dispersion of the clock signal. Even under such a case as above, it is possible to perform a recovering against the response delay while reducing the dispersion. Accordingly, it becomes possible to provide a sensor that can be conveniently used by a user.

Figure 5:
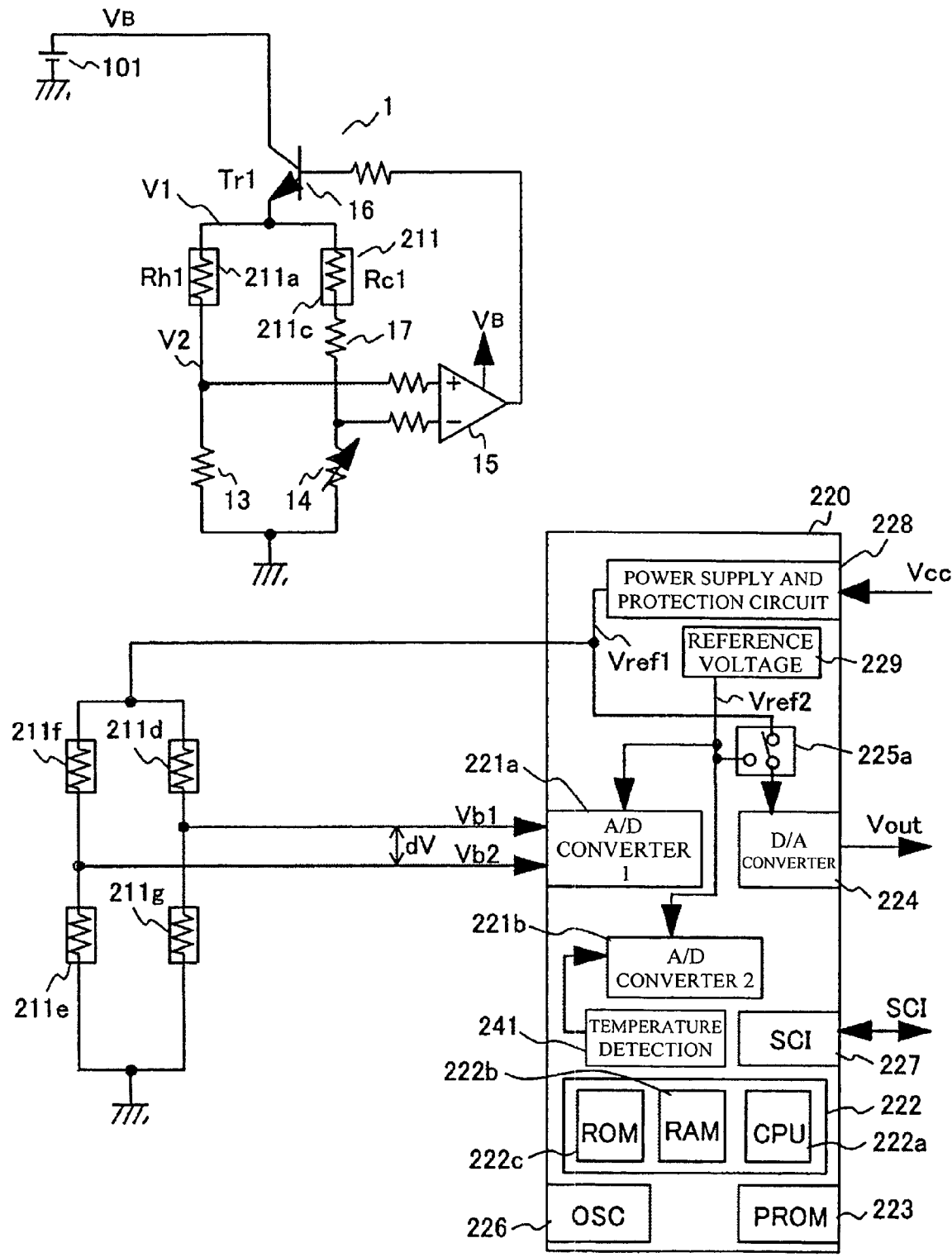
FIG. 5 is a block diagram for showing a thermal air flow meter used in the aforesaid preferred embodiment.

Referring to FIG. 5, a practical hardware configuration will be described as follows.

A control system shown in FIG. 5 is made such that temperature detecting resistors 211*d* to 211*g* are arranged at positions thermally influenced by the heat generating resistor 11 (upstream and downstream positions of the heat generating resistor 11). Such a structure as above can attain a flow rate accompanied with a directional characteristic with a voltage signal corresponding to a temperature difference of the resistor and this is called as a so-called differential temperature type flow meter. This system is suitable for detecting a flow rate including a large pulsation such as enabling a detection of an inverse flow rate through detection of an orientation of the flow to be carried out.

The hot-wire driving circuit 1 is connected to a power supply 101. The hot-wire driving circuit 1 is constituted by a Wheatstone bridge circuit having a heat generating resistor 211*a*, a temperature accommodation resistor 211*c*, resistors 13, 14 and 17. In addition, it is constituted such that a current flowing at the heat generating resistor 211*a* is adjusted by a differential amplifier 15 and a transistor 16 in such a way that a potential at the middle point of the bridge may become a zero.

When a heating temperature of the heat generating resistor 211*a* is low, an output of the differential amplifier 15 is increased and further it is operated to heat the resistor. With this constitution as above, the current flowing at the heat generating resistor 211*a* is controlled without being dependent on a flow speed (a flow rate), but controlled in such a way that a resistance value of the heat generating resistor 211*a* is kept constant, i.e. a temperature difference becomes a specified value.

The temperature detecting resistors 211*d*, 211*e*, 211*f* and 211*g* arranged at the upstream side and the downstream side of the heat generating resistor 211*a* constitute a bridge, and a temperature difference of the resistors is detected in reference to a difference between the middle point potentials Vb1, Vb2. In this system, an output corresponding to a direction of flow can be attained.

In this case, the temperature detecting resistors 211d, 211e, 211f and 211g are driven by a power supply voltage Vref1 at its specified voltage. A system for detecting the temperature difference of the resistor has a superior sensitivity at a low flow rate side due to its differential detection and this is suitable for detection of flows in both directions such as an inverse flow.

Figure 6:
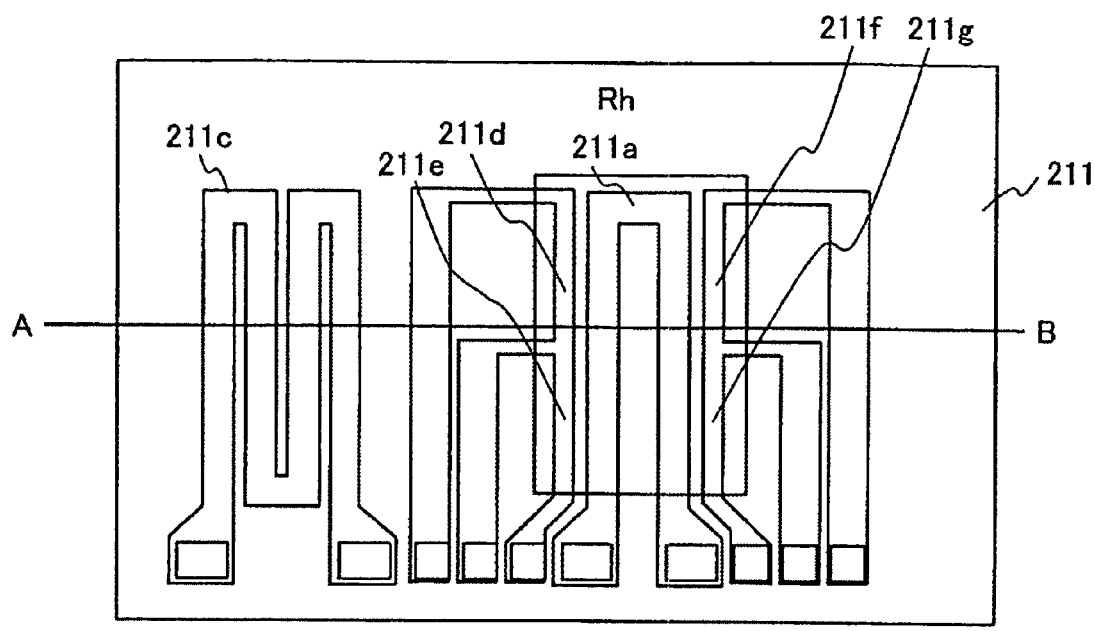
FIG. 6 is a pattern diagram for showing a resistor formed on a silicon substrate.

In this preferred embodiment, the heat generating resistor 211a is formed at a silicon semiconductor substrate 211 in its thin film and one example of the pattern is shown in FIG. 6.

The heat generating resistor 211a is longitudinally extended in its shape, its resistor has a folded back pattern and the resistor is constructed such that the resistors 211d, 211e, 211f and 211g for detecting a temperature are arranged at both sides of the pattern. The heat generating resistor 211a, and the resistors 211d, 211e, 211f and 211g for use in detecting temperature are arranged at the diaphragm structure etched from the rear surface of the silicon substrate 211, for example, and having a low heat capacity.

Figure 7:
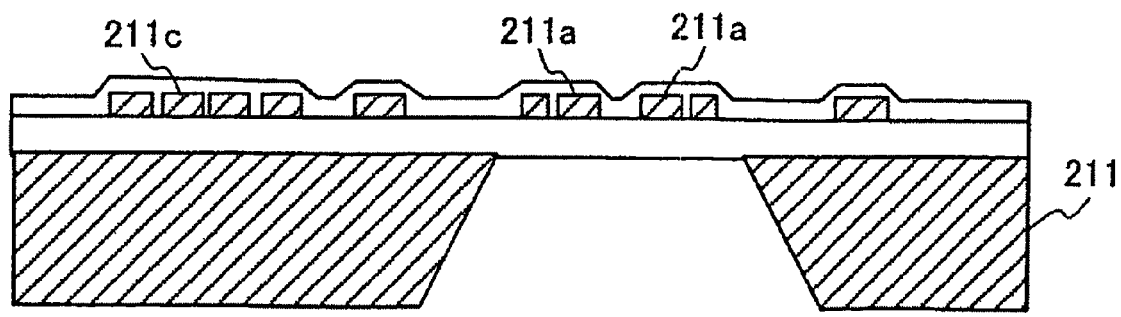
FIG. 7 is a sectional view for showing a resistor formed on a silicon substrate.

The temperature compensating resistor 211c for use in compensating for an air temperature is arranged at such a location as one where it is hardly influenced by a temperature caused by heating at the heat generating resistor 211a. Its sectional structure is shown in FIG. 7. Its structure is set such that the location where the resistor pattern is present has the thickest thickness.

Potentials Vb1, Vb2 at the bridge middle points of the temperature detecting resistors 211d, 211e, 211f and 211g are inputted to the digital error adjustment device 220. The digital error adjustment device 220 has two analog/digital converters 221a, 221b in correspondence with the input potentials Vb1, Vb2 so as to convert the voltage value corresponding to a flow rate into a digital value and read it.

CPU 222a of the microcomputer 222 performs a digital arithmetic operation for executing a pre-processing in FIG. 2 that has already been described, and a digital/analog converter 224 converts the pre-processed output voltage Vout into an analog form and sends it to the engine control unit and the like.

In this case, the digital error adjustment device 220 has a configuration that is similar to that of the aforesaid preferred embodiment. A voltage Vcc supplied from an external unit is inputted to a power supply and protection circuit 228 inside the device as a power supply. The power supply and protection circuit 228 supplies the power supply voltage Vref1 depending on the external voltage Vcc to the analog/digital converters 221a, 221b and the digital/analog converter 224 as a reference voltage through a switch 225a.

The switch 225a switches between a voltage Vref2 generated at the reference voltage circuit 229 inside the digital error adjustment device 2 and the power supply voltage Vref1 depending on the prior external voltage Vcc. In this case, the analog/digital converters 221a, 221b require a precision because the outputs Vb1, Vb2 and the like of the bridge circuit are directly inputted. In order to assure the precision and keep a size of the circuit small, it is satisfactory to apply $\Delta\Sigma$ type analog/digital converter, for example.

The digital/analog converter 224 can also similarly change the reference voltage through the switch 225. This is used for making a free selection of a reference value when the interface is attained with an analog value. When the reference voltage of the analog/digital converter at the control unit side connected to the error adjustment device (the pre-processing device) 2 and the voltage Vcc supplied from the external unit are changed similarly or in a synchronized state, the power supply voltage Vref1 is applied as a reference value and in turn when it has no relation with the control unit, the independent reference voltage Vref2 is selected. With this operation, a correspondence between the pre-processing device and its corresponding control unit can become easy and then an error caused by an un-matching with the analog interface can be reduced.

As the heat generating resistor 211, a hot-wire type can be applied in addition to a polysilicon resistor (a semiconductor type). The hot-wire type is made such that either a platinum hot-wire or a tungsten hot-wire acting as a heat generating member is wound around the surface of either a cylindrical or column-like bobbin made of insulation material having a superior thermal conduction such as a ceramic material, for example, and either glass or ceramics is applied as coating for a covered material. In addition, it may also be applicable that either a thin film or a thick film made of platinum or tungsten acting as the heat generating member or the like is formed on the substrate such as a plate-like glass or ceramics, silicon and the like.

The heat generating resistor 211, temperature detecting resistors 211d to 211g and temperature compensating resistor 211c are installed in an intake passage of an internal combustion engine such as one applied in an automobile or the like and then a voltage output of the temperature detecting resistor (it may be a voltage output of the heat generating resistor) corresponding to an air flow rate flowing in the intake passage can be attained as an output.

This output voltage is inputted to the analog/digital converters 221a, 221b stored in the digital error adjustment device 220 constituted by a digital means such as a microcomputer or an exclusive logic and converted into a digital form.

CPU 222a in the digital error adjustment device 2 applies a response recovery processing against the converted digital value as required and subsequently performs an output adjustment for compensating for a respective dispersion of the sensor characteristic. Subsequently, the voltage signal of the sensor is converted into a flow rate by an optional first conversion equation fx1 to attain its smoothening, and then a non-uniform linear processing such as adjustment of sensitivity with a second conversion equation fx2. As an output after performing the non-linear formation, the linear formation processing is applied again as required and then a non-linear voltage value is outputted at the engine control unit and the like under application of the digital/analog converter 224.

The digital error adjustment device 220 comprises a non-volatile memory (ROM) 222c having either a flow rate conversion map or a program stored therein acting as a reference for various kinds of flow rate conversion equation; a rewritable memory (PROM) 223 recording individual difference information such as a dispersion of resistance value of the heat generating element 11, a smoothening degree in the smoothening processing (a frequency characteristic and the like), some adjustment parameters for changing various functions for applying the non-uniform linear formation and a degree of response recovery processing; a random access memory (RAM) 222b used in an arithmetic work area of the CPU 222a; and an oscillator (OSC) 226 for generating an internal clock and the like. Although the rewritable PROM 223 is not stored in the digital error adjustment device 220, if there is provided one capable of performing more than one time writing operation, it may also be applicable to provide a fuse-type ROM or an electrically erasable EEPROM, a total erasing flash ROM and a high-speed non-volatile memory utilizing a polarization phenomenon of a ferroelectric film and the like.

In accordance with such a first preferred embodiment described above, there are provided some effects that an error caused by the non-linear characteristic can be reduced without damaging a basic characteristic of sensor output from the thermal flow meter and a restriction in use against a user utilizing this sensor is reduced. In addition, it becomes possible to realize a flow meter having a correction dispersion at the time of response delay correction (recovering of the response delay), and it is possible to improve a drivability of an automobile and its productivity.

Figure 8:
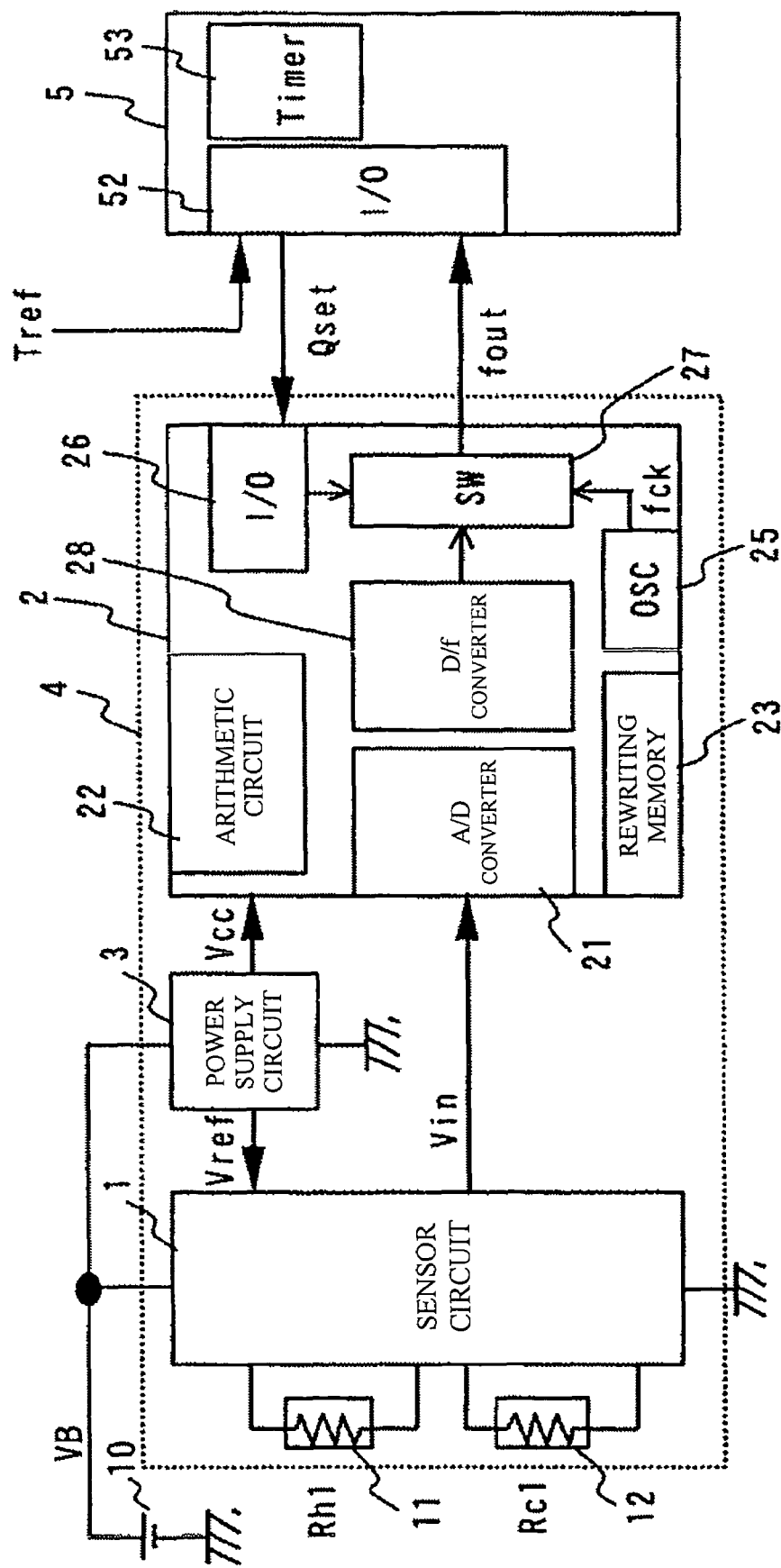
FIG. 8 is a configuration view for showing a flow meter and a control system according to a second preferred embodiment of the present invention.

Then, referring to FIG. 8, a second preferred embodiment of the present invention will be described as follows. This is one example in which a frequency signal is applied in I/F (interface) signal.

A feature differing from that of the previous preferred embodiment consists in outputting a signal using the digital/frequency converter (D/f converter) 28 and there is provided an advantage that handling of a pulse signal facilitates an overlapping of signals.

The engine control unit 5 has a constitution in which there is provided a timer 5 for use in counting a frequency, and a reference signal Tref such as a crank angle of the engine or the like can be inputted. A selection of responding characteristic of the output signal fout from the sensor or a changing-over between the output signal and the reference clock signal fck and the like can be carried out in the same manner as that of the prior preferred embodiment.

Figure 9:
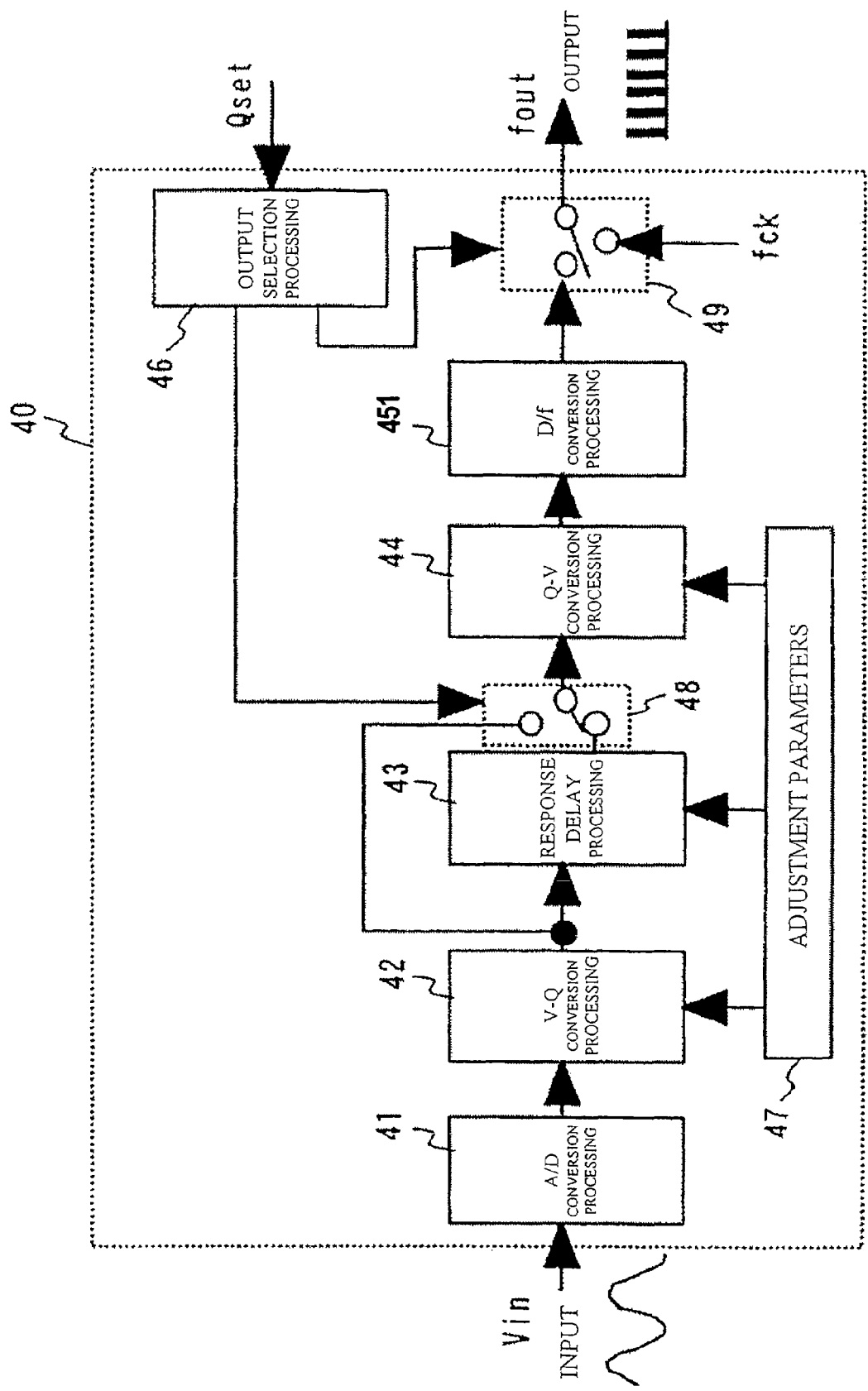
FIG. 9 is a block diagram for showing a digital processing of the thermal flow meter according to a second preferred embodiment of the present invention.

Referring to FIG. 9, a flow of detailed arithmetic processing will be described as follows. At the arithmetic part 40, an output Vin of the sensor circuit 1 is applied as an input, it is changed into a digital form through the analog/digital conversion processing 41, it is further processed with the response recovery processing as required, thereafter it is processed with V-Q conversion 42 (a changing-over of voltage-flow rate) and a response delay processing 43 is carried out. Presence or non-presence of application of the response delay processing 43 can be selected through a software switch 48 at the time of output.

After the response delay processing 43, the signal is applied as a non-linear signal similar to the voltage signal Vin inputted through Q-A conversion (flow-rate to voltage conversion) and a compressed frequency signal is outputted in a non-linear form by the digital/frequency converter 451. In addition, it is possible to output the sensor output signal and the reference clock signal fck while being changed over or to select presence or non-presence of the response delay by the output selecting processing 46 operated by the control signal Qset from the engine control unit and the like. In this case, since there occurs a case in which a dynamic range can be set relatively large, it is not necessary that the signal is set to the non-linear signal similar to the voltage signal Vin inputted through the Q-V conversion (a conversion of flow rate-voltage) 44.

It is possible to output, from the sensor through one signal line, both a usual frequency output fout and a different signal such as the reference clock fck or the like by a selection signal or the like obtained from the external unit (or the repeating processing of the digital error adjustment device 2 itself and the like when an internal specified condition is fulfilled).

Figure 10:
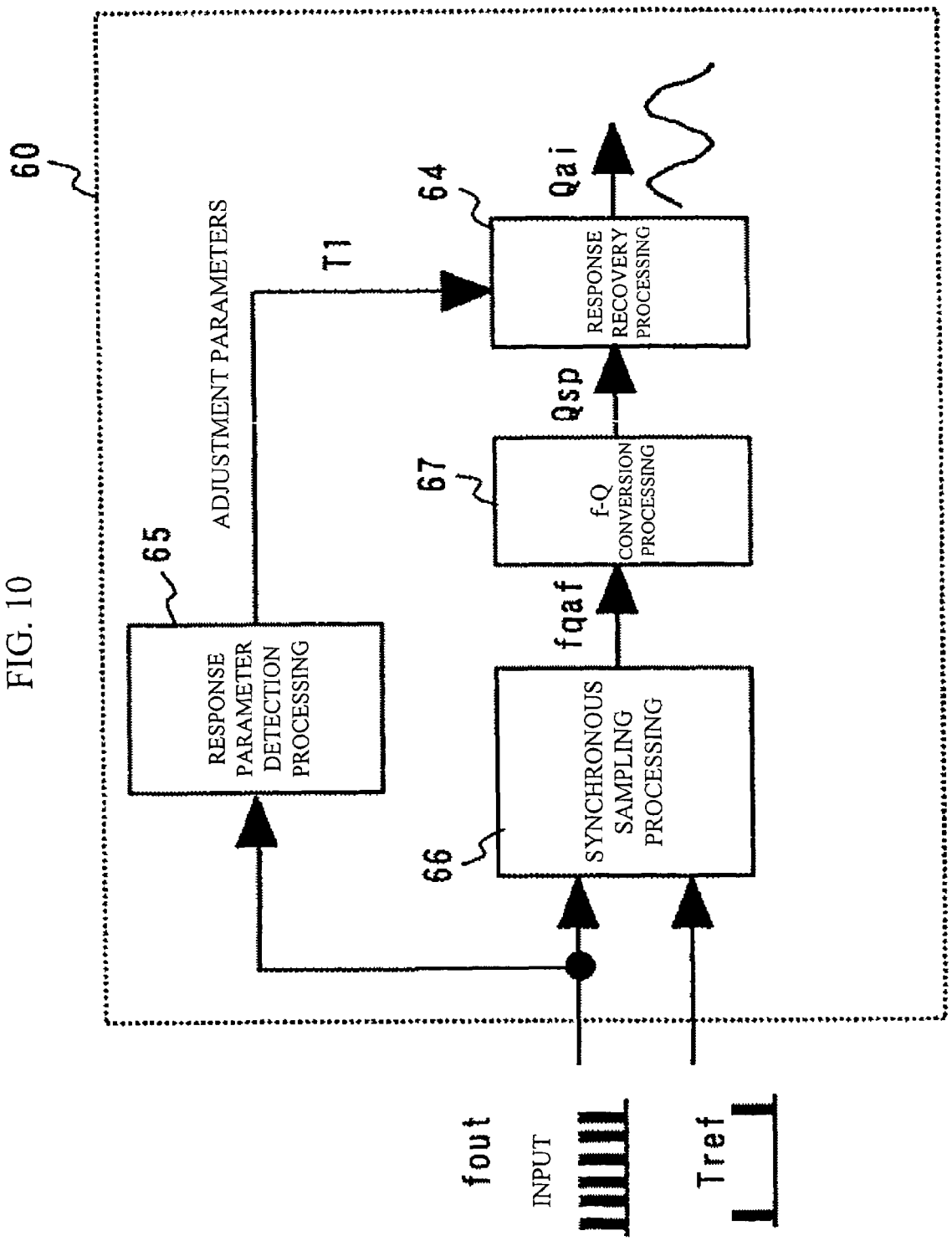
FIG. 10 is a block diagram for showing a digital processing of an engine control unit according to a second preferred embodiment of the present invention.

Then, referring to FIG. 10, a flow of arithmetic processing of the engine control unit 5 will be described as follows. The control unit 5 inputs the frequency output fout of the flow rate sensor, the frequency signal is changed into a digital value through the synchronized sampling processing 66, it is changed into a flow rate value through a F-Q conversion (a conversion of frequency-flow rate) 67, thereafter the response recovery processing is applied against the flow rate value Qsp having a response delay (one in which the frequency output fqaf of the sensor is changed into a flow rate) through the response recovery processing 64 to attain a signal Qai having its responding characteristic recovered. At this time, a responding characteristic of the response recovery processing 64 is adjusted with an adjustment parameter T1 for use in recovering the responding characteristic.

Figure 11:
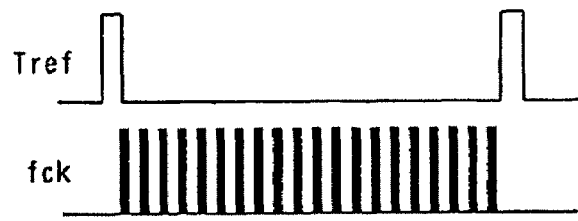
FIG. 11A is an illustrative view for showing a frequency signal transmittance according to a second preferred embodiment of the present invention.
FIG. 11B is an illustrative view for showing a frequency signal transmittance according to a second preferred embodiment of the present invention.
Figure 11:
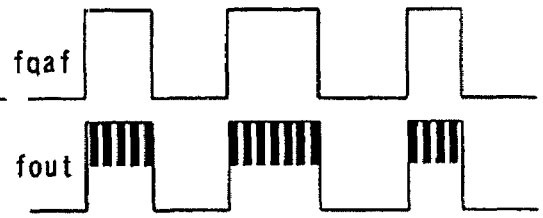
Figure 15:
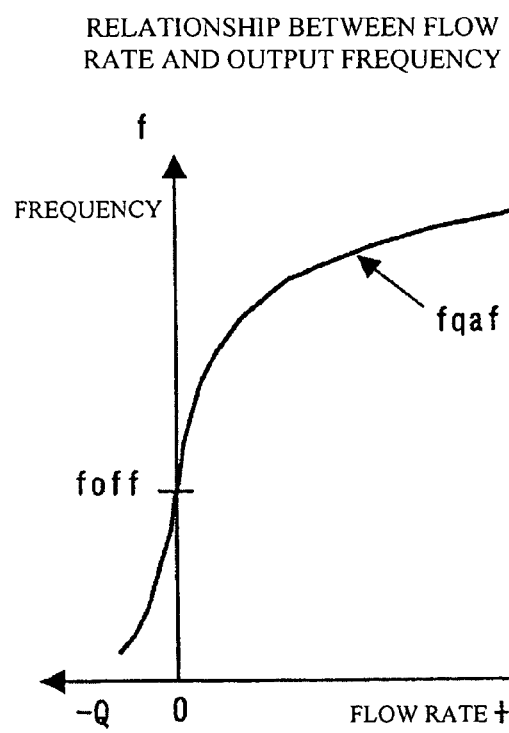
FIG. 15 shows a relationship among a flow rate, a frequency and the number of counted clocks.
Figure 15:
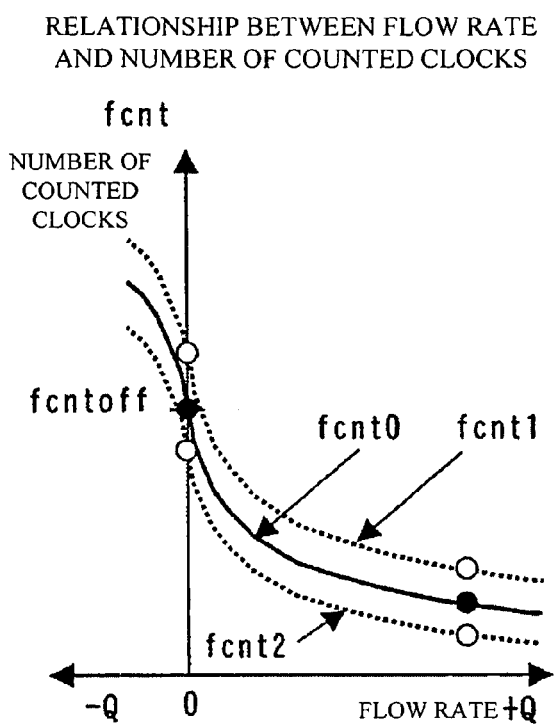

As shown in FIG. 11A, as to the reference clock signal fck in regard to the frequency signal fout, dispersion information of a clock is attained by counting the clock using the reference signal between it and Tref. In this case, as shown in FIG. 11B, it is also applicable that the reference clock signal fck is outputted while overlapping the reference clock signal fck on the frequency output signal fout. It is possible to acknowledge a dispersion of the reference clock signal fck by detecting either the frequency of the reference clock or the number of counting of the pulses within a specified time through the response parameter detection processing 65. If the dispersion of the reference clock is found, it becomes also possible to perform an automatic production of the adjustment parameters used in the response recovery processing 64. In FIG. 15 are shown a relationship between a flow rate and an output frequency and a relationship between the flow rate and the number of clock count.

The counted number for a clock is an inverse number in respect to an output frequency that becomes a non-linear output against the flow rate. If the counted number of a clock pulse at a point of zero flow rate and a certain flow rate point are measured at two points in regard to a specified reference characteristic fcnt0, a dispersion caused by the entire clock can be estimated. Accordingly, it is possible to correct a dispersion in response delay in regard to a flow rate (caused by a dispersion of a clock) in a highly accurate manner by a method wherein a representing characteristic of the counted number of clock is stored in a memory or the like in advance and corrected on the basis of the estimated dispersion.

In the preferred embodiment of the present invention, applying a frequency in a signal enables a precision in responding characteristic to be improved while preventing a deterioration in precision caused by floated signal at the ground side which is specific to an analog signal.

Next, a third preferred embodiment of the present invention will be described as follows. Optional adjustment in regard to a response delay (fast, delay) of an I/F signal, type of signal transmittance (a voltage output, a frequency output) can be carried out with a signal SCI (Serial Communication Interface) of an external controller such as the engine control unit or the like, or the selection signal Qset and the like that has already been described. If a real time adjustment for the responding characteristic becomes possible as described above, a matching operation can be easily carried out even if either an engine or an intake system is changed.

Figure 12:
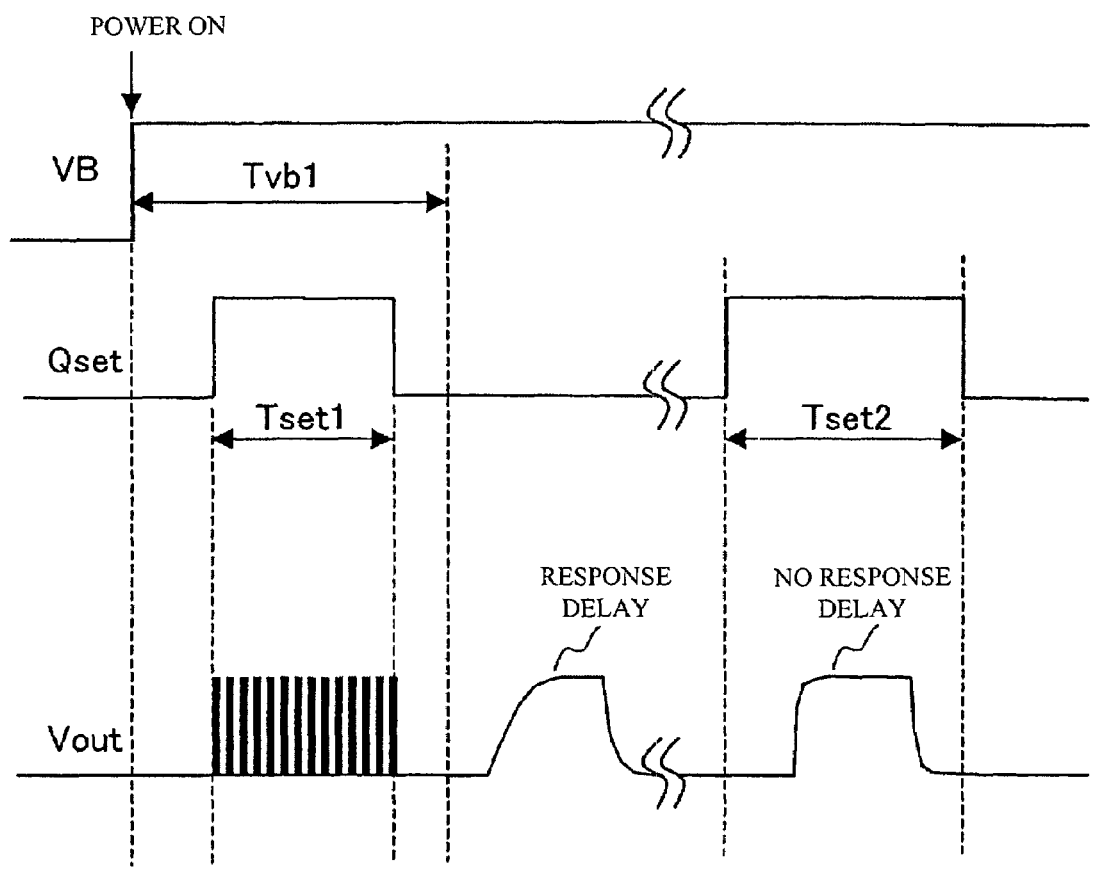

Referring to FIG. 12, an operation caused by a practical external controller will be described as follows. Although this operation corresponds to a case where an output is a voltage, a similar case can be applied for a frequency.

At first, noticing a raising of a battery voltage VB at the time of turning-on of the power supply, this is determined in reference to an operation of the digital error adjustment device 2 itself while a specified time Tvb1 just after the battery voltage VB, for example, is applied as a just-after energization of VB. When the output selection signal Qset shows elapsing of a specified time HI under this state (Tset1), it is determined as an outputting operation after turning-on operation through the output selection processing 46 (FIG. 9), and the clock signal fck is selected as the output signal. In this case, a digital signal of high frequency corresponding to the clock signal is outputted as the output signal of the sensor. When the output selection signal Qset becomes Lo, the clock operation ends and the operation becomes a usual outputting operation (an operation with a response delay in this case).

To the contrary, when the output selection signal Qset becomes a specified time Hi (Tset2) upon elapsing the specified time Tvb1 just after the battery voltage VB, it is outputted while the response delay processing is eliminated, and an output signal Vout having a less amount of response delay (or the response delay is scarcely none) can be attained. In this way, it becomes possible to perform a controlling operation with reduced response delay at the controller by outputting a clock signal becoming a reference in response and a presence or non-presence of response delay from an external unit.

Figure 13:
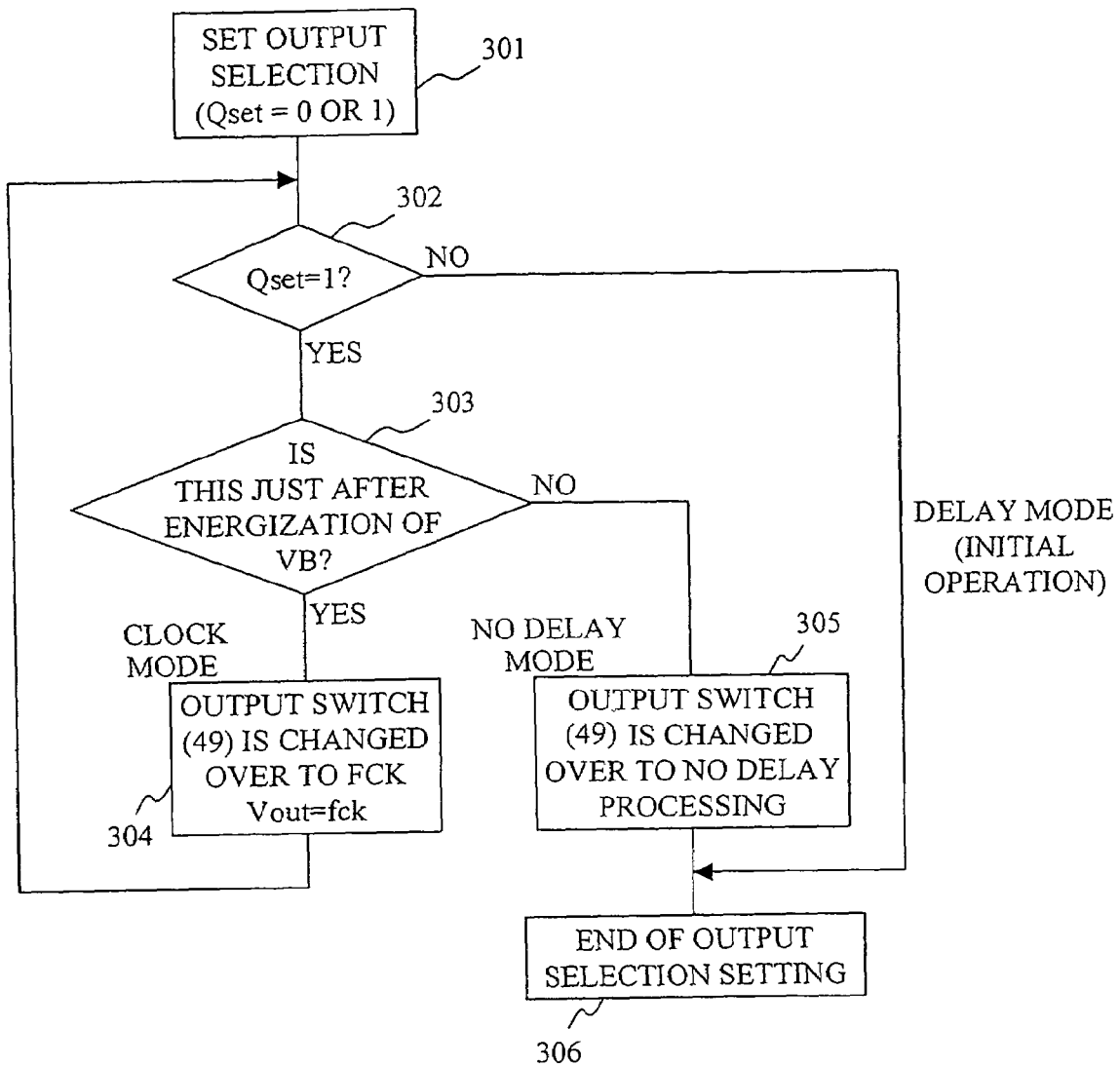
FIG. 13 shows an algorithm for selecting an output at a sensor side used in the aforesaid preferred embodiment.
Figure 14:
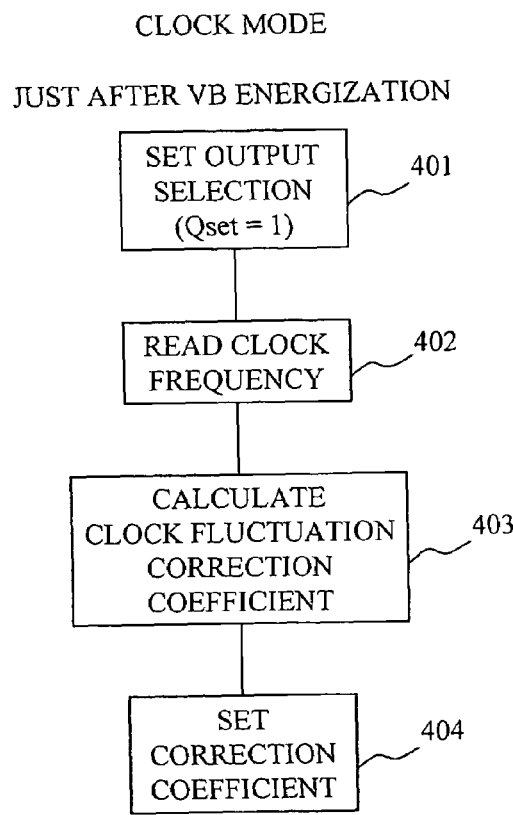
FIG. 14A shows an algorithm (clock mode) for selecting an output at a control unit used in the aforesaid preferred embodiment.
FIG. 14B shows an algorithm (delay determination mode) for selecting an output at a control unit used in the aforesaid preferred embodiment.
Figure 14:
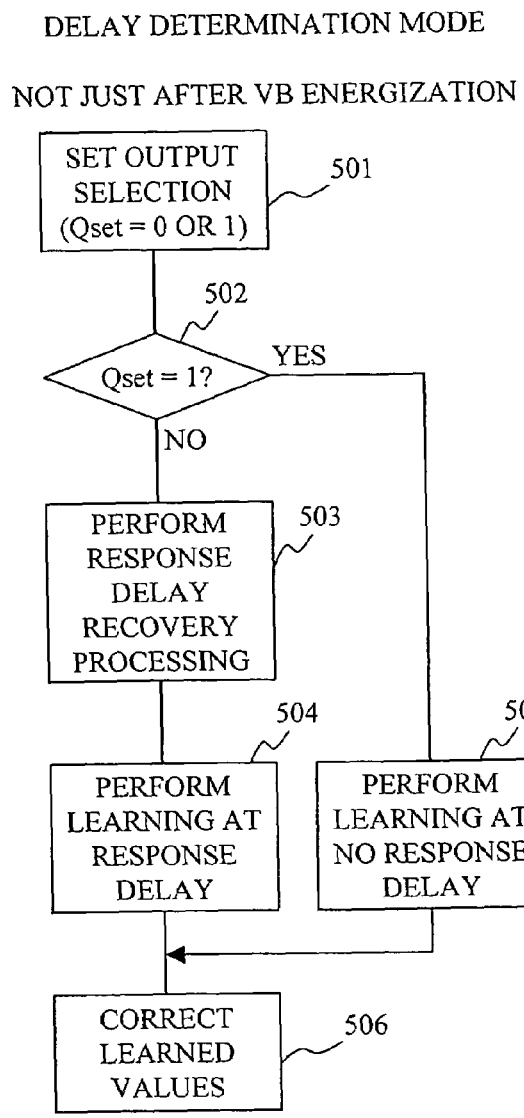

In FIGS. 13 and 14 is shown a practical algorithm. FIG. 13 shows an algorithm operated with the digital error adjustment device 2 and FIGS. 14A and 14B show an algorithm operated at the external controller 5. They become operations closely related to each other.

At first, in FIG. 13, a selected value Qset is read out through an output selection setting 301 determining an inputted state in respect to a signal set by the external controller 5.

Next, either 1 or 0 (Hi or Lo) is determined through a determination processing 302. If it is 0 (Lo), the output selection processing is finished as a mode having a delay in initial operation.

To the contrary, when the selected value Qset is 1 (Hi), it is determined through a discrimination processing 303 whether or not it is just after energization of the battery voltage VB. If it is determined that this is a just-after energization, the operation is carried out as a clock mode, the output switch 49 is changed over to the fck inputting side and then the signal fck corresponding to the clock is outputted from the sensor output terminal. Upon completion of this mode, the operation jumps to the determination processing 302 for the selected Qset and when the output selection value Qset becomes 0 (Lo), the operation is completed.

When the determination processing 303 determines that the operation is not carried out just after energization of the battery voltage VB, the output switch 49 is changed over to a side of non-presence of response delay processing (305). As a result, the output signal Vout becomes an operation mode in which a signal having no response delay (a signal having a less amount of delay) is outputted, and the output setting processing is finished. In this preferred embodiment, as long as the output setting is not performed again, it is assumed that the output operation mode is continued.

Next, referring to FIGS. 14A and 14B, the algorithm at the external controller 5 will be described as follows. In FIG. 14A is shown the algorithm of the external controller 5 corresponding to the clock mode. In this case, the output selection value Qset is set to 1 (Hi) just after energization of the power supply VB to make a clock mode (401). After this operation, the clock signal is read (402). A correction coefficient with dispersion is calculated in reference to the read-out clock (403). As a result, a correction coefficient for correcting a response caused by displacement of the clock is set and finished (404).

To the contrary, in FIG. 14B is shown a delay discrimination mode other than the time of just-after energization of VB. In this case, the output selection value Qset is set to either 1 (Hi) or 0 (Lo) (501), the response delay mode is determined by itself (502) and when the output selection value Qset is 1 (Hi), various kinds of processing are carried out under an assumption that response delay is not present. In this case, an amount of correction for the discharging gas of an internal combustion engine when no response delay occurs, for example, is learned (505). To the contrary, when the output selection value Qset is 0 (Lo), the response delay recovery processing (503) is carried out and an amount of correction of the discharging gas at the time of response delay is learned (504). The response delay recovery processing (503) may be present or not present. As a result, a difference between the presence or non-presence of the response delay is applied as a correction value for study to enable some effects of study for the discharging gas in response to a precision such as error in correction caused by the presence or non-presence of response delay and the presence or non-presence of correction of the response delay (503) to be attained, and further some effects that adaptation for the discharging gas becomes easy under various conditions. It is also applicable that these operations are carried out only when an adjustment such as a test of discharging is performed.

In accordance with the aforesaid preferred embodiments, even if the error in pulsation is changed due to a modification of an engine or an intake system, the reduction in error of pulsation can be easily carried out without making any substantial modification of the characteristic in the intake system or sensor itself. As a result, it shows an effect that a development period for a measuring system for an engine intake system can be remarkably shortened.

In all the preferred embodiments described up to now, the measurement error at the time of pulsation or a transmittance response is reduced to enable some effects to be attained that a more superior precise control is performed when it is applied in an engine control and the discharging gas is reduced or fuel consumption is improved.

In addition, even if the flow meter used in the prior art flow meter is used for a gas detection of hydrogen gas as found in a fuel cell and the like, a similar effect can be attained.

What is claimed is:

1. A control system comprising
    a thermal flow meter for outputting a non-linear signal in response to a flow rate;
    a pre-processing means for performing a pre-processing whereby an output of said flow meter is linearized and smoothed and is then rendered back to a non-linear output;
    and a control unit for calculating an amount of control for a controlled device based on the preprocessed output of said flow meter, wherein
    said pre-processing means has a function to output a parameter to the control unit, the parameter indicating the magnitude and a range of a variation of response delay caused by the smoothing of the output of said flow meter; and
    said control unit has a function to correct said response delay and a function to reduce a dispersion in correction of response delay based on said parameter.

2. A control system comprising a thermal flow meter for outputting a non-linear signal in response to a flow rate; and a control unit for calculating an amount of control of a controlled equipment on the basis an output of said flow meter that is pre-processed, wherein
    said system further comprises a response delay element for adding a response delay having a time constant which is larger than a response delay of said flow meter to said output signal at a pre-processing step when an output signal of said flow meter is inputted to said control unit,
    wherein said control unit has a function for correcting said response delay by using information on said response delay added by said response delay element,
    wherein whether or not said output signal is passed through said response delay element can be selected in response to an instruction from said control unit or other external units at a pre-processing step when an output signal of said flow meter is inputted to said control unit.

3. A control system comprising a thermal flow meter for outputting a non-linear signal in response to a flow rate; and a control unit for calculating an amount of control of a controlled equipment on the basis an output of said flow meter that is pre-processed, wherein said system further comprises a response delay element for adding a response delay having a time constant which is larger than a response delay of said flow meter to said output signal at a pre-processing step when an output signal of said flow meter is inputted to said control unit, wherein said control unit has a function for correcting said response delay by using information on said response delay added by said response delay element, wherein an output signal of said flow meter is processed in a digital manner before being inputted to said control unit, and information on said response delay is a clock signal used for a digital processing.

4. A control system comprising a thermal flow meter for outputting a non-linear signal in response to a flow rate; and a control unit for calculating an amount of control of a controlled equipment on the basis an output of said flow meter that is pre-processed, wherein said system further comprises a response delay element for adding a response delay having a time constant which is larger than a response delay of said flow meter to said output signal at a pro-processing step when an output signal of said flow meter is inputted to said control unit, wherein said control unit has a function for correcting said response delay by using information on said response delay added by said response delay element, wherein an output signal of said flow meter is a frequency output and processed in a digital form before being inputted to said control unit, information on said response delay is a clock signal used for the digital processing, and this clock signal is overlapped on a frequency of the output signal of said flow meter and outputted.

5. A control system comprising a thermal flow meter for outputting a non-linear signal in response to a flow rate; and a control unit for calculating an amount of control of a controlled equipment on the basis an output of said flow meter that is pre-processed, wherein said system further comprises a response delay element for adding a response delay having a time constant which is larger than a response delay of said flow meter to said output signal at a pre-processing step when an output signal of said flow meter is inputted to said control unit, wherein said control unit has a function for correcting said response delay by using information on said response delay added by said response delay element, wherein an output signal of said flow meter is a frequency output synchronized with a reference signal of frequency, processed in a digital form before being inputted to said control unit, information on said response delay is a clock signal used for the digital processing and this clock signal is counted by said reference signal.

* * * * *